Jan. 4, 1966

G. D. HUNTER 3,227,225

CHISEL PLOW

Filed Oct. 19, 1964

INVENTOR.
GEORGE D. HUNTER

INVENTOR.
GEORGE D. HUNTER

INVENTOR.
GEORGE D. HUNTER

INVENTOR.
GEORGE D. HUNTER

United States Patent Office 3,227,225
Patented Jan. 4, 1966

3,227,225
CHISEL PLOW
George D. Hunter, Des Moines, Iowa, assignor to Deere
& Company, Moline, Ill., a corporation of Delaware
Filed Oct. 19, 1964, Ser. No. 404,572
6 Claims. (Cl. 172—456)

This invention relates generally to agricultural implements and more particularly to ground-working implements having tools raised and lowered into and out of transport and ground-working positions.

The object and general nature of this invention is the provision of a ground-working implement having new and improved ground wheel raising and lowering means and new and improved means for narrowing the implement to facilitate transport along or through lanes, narrow roadways, gates, and the like. A further feature of this invention is the provision of novel means interconnecting the narrowing means with the raising and lowering means so that the same power means may be employed for both operations. Further, an additional feature of this invention is the provision of an operating connection optionally connectible with an outrigger for raising or lowering it or connectible to ground wheel means for raising or lowering the main and outrigger frame sections simultaneously for controlling the depth of operation of all of the tools, both those carried by the main frame section and those carried by the outrigger section.

These and other objects and advantages of this invention will be apparent to those skilled in the art after a consideration of the following detailed description of the preferred embodiment, taken in conjunction with the accompanying drawings, in which.

Figure 1:
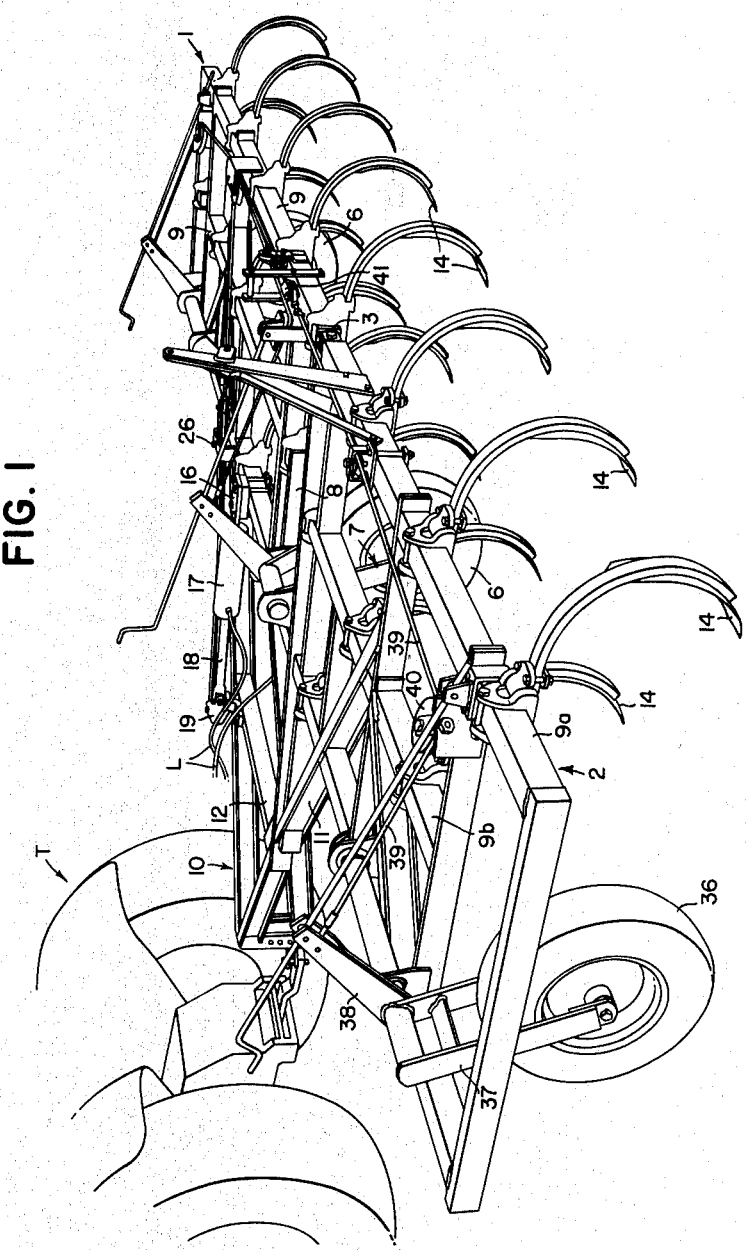
FIG. 1 is a perspective view of a tractor propelled chisel plow incorporating the principles of this invention, the implement being shown in its field transport position.

The implement of this invention comprises frame means in the form of a main frame section 1 and an outrigger frame section 2 hinged together, as at 3, to accommodate movement of the outrigger section into and out of a folded transport position and an extended working position generally in line with the main frame section 1. Ground wheels are provided for supporting the main and outrigger frame sections. The ground wheels for the main frame sections are shown at 6, each being mounted on a swingable arm 7 pivoted to the main frame section 1 adjacent a fore-and-aft extending frame bar 8 that is rigidly connected, as by welding to associated transverse frame bars 9. A hitch frame 10 is provided, being made up of diagonal bars 11 and a transverse brace 12.

The hitch frame 10 extends forwardly from the main frame section generally from adjacent the end of the main frame section where the outrigger frame section 2 is hinged thereto whereby when both frame sections are in their working position, (FIG. 1) draft forces are substantially balanced. Ground working tools, such as chisels 14, are fixed in selected positions to the transverse frame bars 9 and to similar transverse bars 9a and 9b of the outrigger frame section 2.

A power cylinder 17 is pivotally connected at its closed end to a bracket 16 fixed to the forward main frame transverse bar 9 and the cylinder includes a forwardly extending piston rod 18, the forward end of which is connected to the midpoint of a generally horizontally swingable lever 19 that at one end is pivoted to a bracket 21 fixed to the transverse bar 12 that forms a part of the hitch frame 10. A fore-and-aft extending pull bar 23 is connected at its forward end to the outer end of the lever 19 and at its rear portion is disposed for sliding movement in a guide or support 24 that is fixed to the front main frame bar 9. The guide or support is apertured, as at 25, as is the rear portion of the pull bar 23, to receive a locking pin 26 (FIG. 1) that when inserted in the registering apertures serves to hold or lock the pull bar against movement relative to the main frame, thus locking all of the ground wheels in their down or transport position. The power cylinder 17 is connected by suitable hose lines L to a controlled source of hydraulic pressure on the tractor T to which the hitch frame 10 is connected, and in the fully retracted position of the piston rod 18 (FIG. 2), the lever 19 occupies a rear position. In the partially extended position of the piston, the lever 19 lies in an intermediate position, rod 18, and in the fully extended position of the piston, rod 18 (FIG. 1), the lever 19 is swung into its forwardmost position. Reference to these three positions will be made below.

A pair of cables 30 are connected to the rear end of the pull bar 23, and extend rearwardly therefrom to a pair of sheaves 31 rotatably carried by the rear transverse main frame bar 9. The two cables 30 extend laterally from said sheaves 31 and along the rear bar 9 to points generally directly behind the associated supporting wheels 6. The cables 30, then extend around sheaves 32 forwardly from the sheaves 31 to upwardly extending arms 33 connected with the wheel arms 7. The cables 30 are of such length that when the lever 19 is swung from its intermediate position forwardly the ground wheels 6 are shifted from the maximum tool depth position to a field and road transport position (FIG. 1) in which the main frame section 1 and the outrigger frame section 2 are lifted to raise the tools out of engagement with the ground. It is in this position that the locking pin 26 may be inserted in the associated registering apertures 25 and 25a for locking the ground wheels in their transport position so that pressure in the cylinder 17 may be relieved to take the strain off the cables 30.

The outrigger frame section 2 also carries a ground wheel 36, substantially identical with the main frame section ground wheels 6, being mounted on a swingable axle 37 to which a generally upwardly extending arm 38 is fixed. The ground wheel 36 is disposed adjacent the laterally outer portion of the outrigger frame section 2 so that when the outrigger frame section is in its lowered position generally in alignment with the main frame section 1, raising and lowering the main and outrigger wheels (FIG. 1) relative to the associated frame sections will simultaneously lower and raise all of the tools into and out of their working and transport positions. To control this operation of the outrigger ground wheel 36, a cable 39 is connected at its outer end to the outrigger ground wheel arm 38. This cable extends from the arm 38 rearwardly to a sheave 40 on the rear bar of the outrigger section and then along the bar to a point of releasable connection with the left-hand cable of the two cables 30. This point of releasable connection takes the form of a clevis 41 (FIG. 2) on the end of an adjacent cable section 42 that is connected to form a part of the left-hand cable 30 and a loop 43 on the laterally inner end of the outrigger cable 39. Thus, when the associated cable 30 is connected to the cable 39 as shown in FIG. 2, operation of the lever 19 will actuate both cables 30 and also the cable 39, thus raising and lowering both main and outrigger frame sections relative to the ground wheels, thus controlling the effective depth of operation of the ground-working tools by raising and lowering both the main frame and outrigger frame sections together in their generally horizontal aligned relation, using only one power cylinder.

According to the present invention, the same power cylinder is also usable for raising and lowering the outrigger frame section for narrowing the implement for transport purposes when the tools and frame sections are raised into non-working positions, and, as described above, the single power cylinder is usable for raising and lowering the ground-working tools together when the frame sections are maintained in extended aligned relation on the supporting wheels.

Assuming, first, that the implement has been operating in the soil and the frame sections raised or lowered as necessary for depth control, and assuming further that it is desired to raise the tools and narrow the implement for transport, if the transport is to be merely across fields it will not be necessary to raise the outrigger frame section. Instead, the operation will merely extend the cylinder 17 and thus exert a pull through the bar 23 and the cables 30 and the cable 39 against all the ground wheels to raise the frame sections and the tools into the position shown in FIG. 1, where the tools 14 are raised out of contact with the ground.

Figure 4:
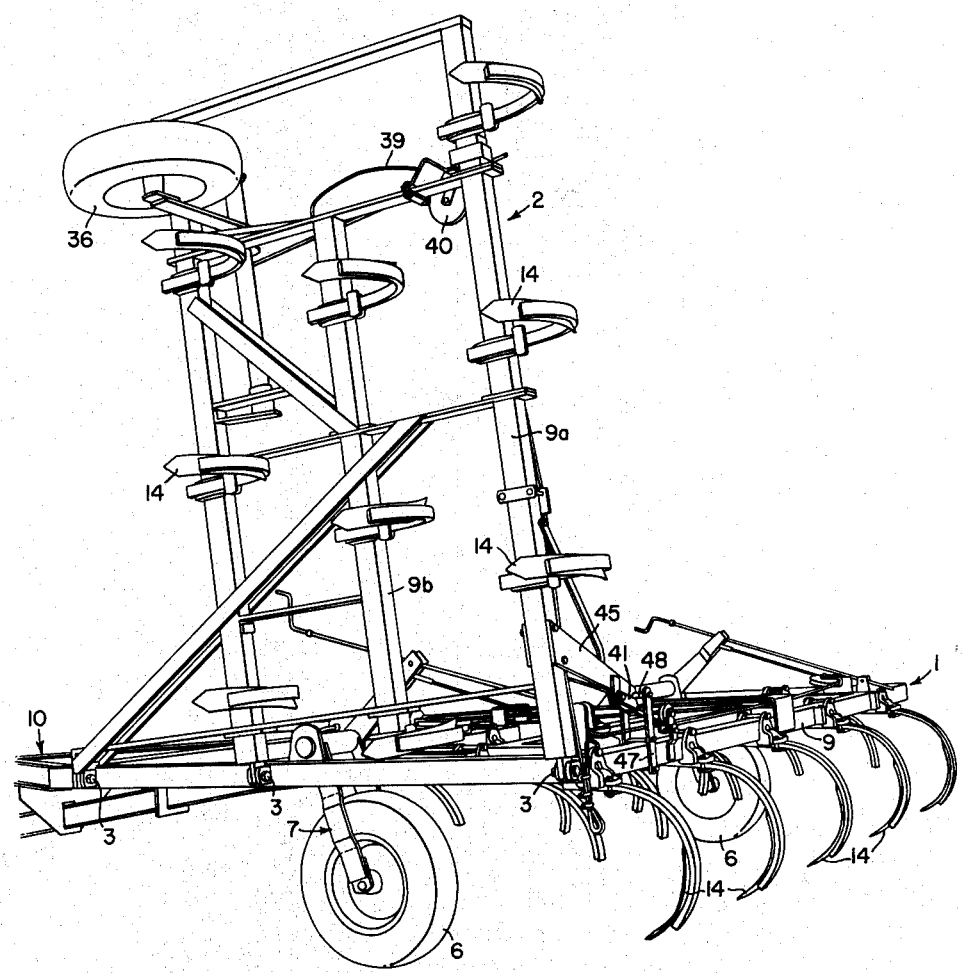
FIG. 4 is a perspective view showing the outrigger section in its fully raised transport position.

If then it should be desired to have the implement pass through narrow gates, along lanes, and other restricted areas, the outrigger frame section may be raised relative to the main frame section. All that is necessary to do this is to stop the outfit where there is a hard spot in the ground and then retract the cylinder which will permit the points of the tools 14 to rest on the ground. The cylinder will then be fully retracted, and the clevis 41 released from the cable 39. The clevis will then be connected to a lift arm 45 that is rigidly fixed to the outrigger frame section, as best shown in FIG. 2. Next the cylinder 17 is extended and the lever 19 moved into its second position. This will start raising the outrigger frame section, and further extension of the cylinder to its limit will then complete the raising of the outrigger frame section and will also raise the main frame sections, together with the raised outrigger section, on the main frame section supporting wheels, as shown in FIG. 4.

In this position of the parts, the openings 25 and 25a in the pull bar 23 and guide 24 come into registry and the locking pin 26 may then be inserted, locking the main frame section in its raised or transport position. Also in the fully raised position of the outrigger frame section 2, an apertured portion 46 of the arm 45 comes into registry with an apertured bracket 47 on the main frame section. A locking pin 48 may be inserted, thus holding the outrigger frame section in its raised position while relieving the cylinder 17 and associated cables and connections of most of the lifting and holding stresses.

Figure 2:
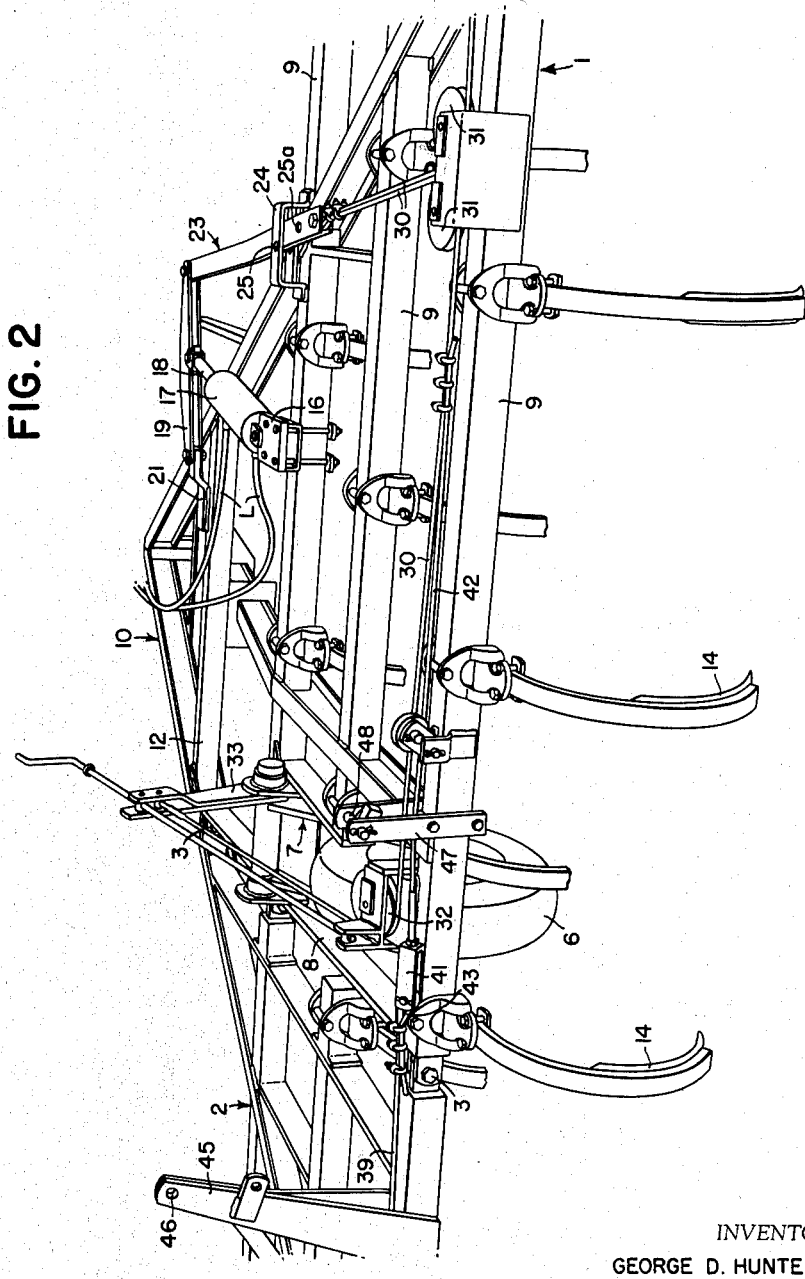
FIG. 2 is a fragmentary rear perspective view of the implement shown in FIG. 1, the implement being illustrated as in its operating or ground-working position.
Figure 3:
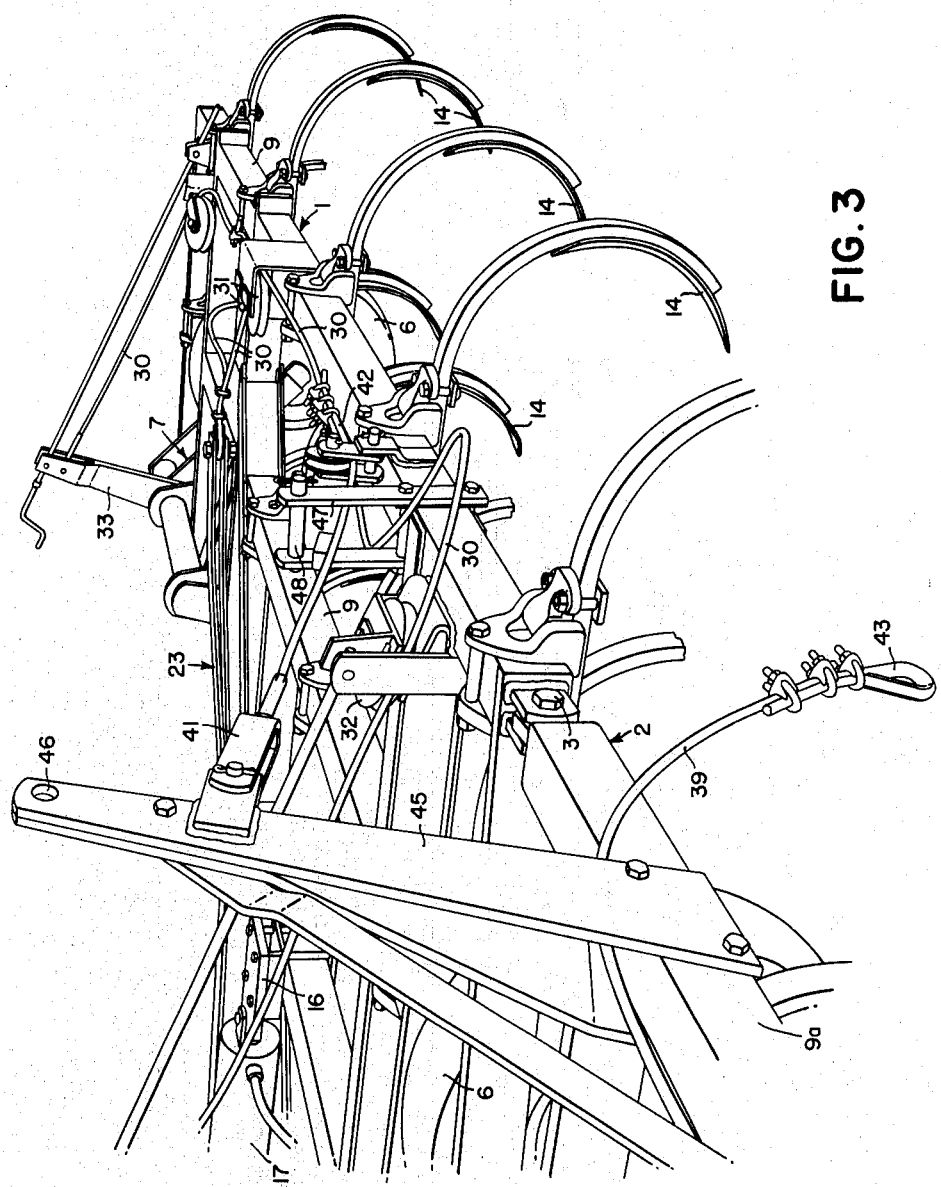
FIG. 3 is a perspective view of the rear portion of the implement of FIG. 1, showing the lifting cable as connected to raise the outrigger section from its ground-working position.

It will be seen, particularly from FIG. 1, that the outrigger section 2 is somewhat shorter in lateral dimension than the main frame section 1, and hence is lighter in weight than the main frame section. This makes for a stable machine since it is assured that when the cylinder is extended, it will be the outrigger section that is raised. Further, the hitch frame section 10 is connected rigidly to the main frame section 1, so that there is no tendency for the frame sections to buckle under certain load conditions.

While I have shown and described above a preferred structure in which the principles of this invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In an agricultural implement, a main frame section, an outrigger frame section hingedly connected to the main frame section, ground-working tools carried by each frame section, a pair of generally vertically shiftable supporting wheels connected with the end portion of said main frame section, a third generally vertically shiftable supporting wheel connected with the outer end portion of said outrigger frame section, a power operated means, a first connection between said power operated means and said pair of supporting wheels for raising and lowering said latter wheels relative to said main frame section, a second connection connected to be operated by said first connection and attachable optionally to a means to raise and lower the supporting wheel of said outrigger frame section relative to the outrigger frame section or to a means to raise and lower said outrigger frame section relative to said main frame section.

2. The invention set forth in claim 1, further characterized by said power operated means being operated through two ranges, one range being that in which said first and second connections are moved to raise or lower said main and outrigger frame sections together relative to said supporting wheels to determine the depth of operation of said tools, and the other range being that in which said outrigger frame section is raised or lowered relative to said main frame section.

3. In an agricultural implement, a main frame section, an outrigger frame section hingedly connected to the main frame section, ground-working tools carried by each frame section, a pair of generally vertically shiftable supporting wheels connected with the end portions of said main frame section, a third generally vertically shiftable supporting wheel connected with the outer end portion of said outrigger frame section, a power operated cylinder including a piston rod carried by said main frame section, a lever pivoted on a vertical pivot at one end on said main frame section, means connecting the outer end of said piston rod to the center portion of said lever, a pair of cables extending from the other end of said lever to said pair of supporting wheels for raising and lowering the latter relative to said main frame section in response to a given movement of said piston rod, a third cable connected with one cable of said pair of cables and connectible with the supporting wheel for said outrigger frame section for raising and lowering said last named supporting wheel relative to said outrigger frame section simultaneously with the raising and lowering of said pair of supporting wheels relative to said main frame section, lockup means connected with said main frame section for holding said pair of supporting wheels in their lower position independent of the position of said piston rod, said third cable being connectible with said outrigger frame section so as to lift said outrigger frame section into a raised position.

4. The invention set forth in claim 3, further characterized by a generally fore-and-aft extending bar connected at its forward end to the outer end of said pivotally mounted lever, means connecting said pair of cables to the rear end of said fore-and-aft extending bar, said lockup means including an aperture bracket carried by said main frame section and slidably receiving said bar, the latter being apertured and the aperture being registerable with the aperture in said bracket when said pivotally mounted lever has been moved into a forward position, and a pin insertable into said registering apertures when said pair of wheels are raised into their transport position.

5. In an agricultural implement, a main frame section, an outrigger frame section hingedly connected to the main frame section, ground-working tools carried by each frame section, a pair of generally vertically shiftable supporting wheels connected with the end portions of said main frame section, a power operated cylinder including a piston rod carried by said main frame section, a lever pivoted on a vertical pivot at one end on said main frame section, means connecting the outer end of said piston rod to the intermediate portion of said lever, said lever lying in a first position when said piston rod is fully retracted, in a second position when the piston rod is partially extended, and in a third position when the piston rod is fully extended, first cable means connected between the outer end of said lever and said outrigger frame section for raising the latter into a folded transport position when said piston rod is shifted into said third position, and second cable means extending from said lever to said pair of supporting wheels for raising the main frame section relative to said pair of wheels when said lever is moved from its second position to its third position.

6. The invention set forth in claim 5, further characterized by, a third generally vertically shiftable supporting wheel connected with the outer end portion of said outrigger frame section, said second cable means being of such length that when said lever is in said first position said second cable means is slack so as to accommodate changing the connection of said first cable from said outrigger frame section to said outrigger frame supporting wheel.

References Cited by the Examiner

UNITED STATES PATENTS

| | | | |
|---|---|---|---|
| 2,699,715 | 1/1955 | Shelton | 172—708 |
| 2,754,739 | 7/1956 | Estes | 172—708 X |
| 2,828,680 | 4/1958 | Johnson | 172—310 |
| 2,960,346 | 11/1960 | Hunter | 172—502 X |
| 2,982,080 | 5/1961 | Martin | 172—456 X |
| 3,003,789 | 10/1961 | Calkins | 172—456 X |
| 3,156,306 | 11/1964 | Dunker | 172—456 |

ABRAHAM G. STONE, *Primary Examiner.*

T. GRAHAM CRAVER, ANTONIO F. GUIDA,
*Examiners.*